(12) United States Patent
Balepin

(10) Patent No.: US 6,769,242 B1
(45) Date of Patent: Aug. 3, 2004

(54) ROCKET ENGINE

(75) Inventor: Vladimir V. Balepin, Butte, MT (US)

(73) Assignee: MSE Technology Applications, Inc., Butte, MT (US)

( * ) Notice: Subject to any disclaimer, the term of this patent is extended or adjusted under 35 U.S.C. 154(b) by 112 days.

(21) Appl. No.: 10/292,558

(22) Filed: Nov. 12, 2002

Related U.S. Application Data
(60) Provisional application No. 60/332,574, filed on Nov. 21, 2001.

(51) Int. Cl.$^7$ .......................... B63H 11/00; B64G 9/00; F02K 9/00; F03H 9/00; F23R 9/00
(52) U.S. Cl. ............................... 60/204; 60/257; 60/266
(58) Field of Search ................... 60/204, 211, 257–267, 60/736

(56) References Cited

U.S. PATENT DOCUMENTS

| | | | | |
|---|---|---|---|---|
| 2,395,113 A | * | 2/1946 | Goddard | 60/259 |
| 2,585,626 A | * | 2/1952 | Chilton | 60/260 |
| 2,785,532 A | * | 3/1957 | Kretschmer | 60/39.48 |
| 2,949,007 A | * | 8/1960 | Aldrich et al. | 60/259 |
| 3,077,073 A | * | 2/1963 | Kuhrt | 60/259 |
| 3,170,295 A | * | 2/1965 | Dryden | 60/39.48 |
| 3,204,402 A | * | 9/1965 | Holmes | 60/240 |
| 3,283,508 A | * | 11/1966 | Schulze | 60/223 |
| 3,306,038 A | * | 2/1967 | Nigel | 60/794 |
| 3,349,566 A | * | 10/1967 | Hunt et al. | 60/259 |
| 3,561,217 A | * | 2/1971 | Hall | 60/204 |
| 3,636,712 A | * | 1/1972 | Kaufmann | 60/260 |
| 3,828,551 A | * | 8/1974 | Schmidt | 60/204 |
| 4,073,138 A | * | 2/1978 | Beichel | 60/245 |
| 4,583,362 A | * | 4/1986 | Wagner | 60/259 |
| 4,589,253 A | * | 5/1986 | Wagner | 60/204 |
| 4,771,600 A | * | 9/1988 | Limerick et al. | 60/258 |
| 4,771,601 A | * | 9/1988 | Spies | 60/259 |
| 4,831,818 A | * | 5/1989 | Martin | 60/204 |
| 4,912,925 A | * | 4/1990 | Foust | 60/259 |
| 5,410,874 A | | 5/1995 | Limerick | |
| 5,444,973 A | * | 8/1995 | Limerick et al. | 60/204 |
| 5,551,230 A | * | 9/1996 | Meng | 60/259 |
| 5,918,460 A | * | 7/1999 | Connell et al. | 60/257 |
| 6,052,987 A | | 4/2000 | Dressler | |
| 6,226,980 B1 | * | 5/2001 | Katorgin et al. | 60/258 |
| 6,470,670 B2 | * | 10/2002 | Maeding | 60/259 |
| 6,619,031 B1 | * | 9/2003 | Balepin | 60/246 |

OTHER PUBLICATIONS

D. Huzel and D. Huang, "Modern Engineering for Design of Liquid–Propellant Rocket Engines" vol. 147, AIAA Series "Progress in Astronautics and Aeronautics" pp 35, 36 (1992).

* cited by examiner

*Primary Examiner*—Justine R. Yu
*Assistant Examiner*—William H. Rodriguez
(74) *Attorney, Agent, or Firm*—Ralph F. Crandell

(57) ABSTRACT

The invention is a coolant system for a rocket engine. The rocket engine includes an injector, a fuel supply, an oxidizer supply, a pump for feeding fuel from the fuel supply to the injector, a pump for feeding oxidizer from the oxidizer supply to the injector, a combustor, and a nozzle, the combustor and nozzle forming a combustor and nozzle assembly. The coolant system includes a cooling jacket surrounding the combustor and nozzle assembly. A coolant fluid is supplied to the combustor jacket by a coolant pump that circulates the coolant fluid through the jacket. The coolant fluid vaporizes to cool the combustor and nozzle assembly. A turbine is operatively connected to the coolant pump and is driven by the vaporized coolant from the jacket. A heat exchanger transfers heat from the vaporized fluid to fuel or oxidizer from the supply thereof prior to the feeding of the fuel or oxidizer into the injector. The vaporized coolant fluid is condensed in the turbine and heat exchanger for recirculation to the combustor and nozzle assembly jacket.

16 Claims, 2 Drawing Sheets

ROCKET ENGINE

CROSS-REFERENCE TO RELATED APPLICATION

This application claims the benefit of Provisional Application Ser. No. 60/332,574, filed Nov. 21, 2001, for "Third Fluid Cooled Expander Rocket Engine" the disclosure of which is by this reference incorporated herein.

BACKGROUND OF THE INVENTION

1. Field of the Invention

This invention relates to rocket engines and more particularly to combustor and nozzle coolant systems therefore.

2. Description of the Prior Art

U.S. Pat. No. 5,410,874, issued May 2, 1995, to C. Limerick for "Method And Apparatus For Increasing Combustion Chamber Pressure In A High-Pressure Expander Cycle Rocket Engine" discloses an expander cycle rocket engine.

U.S. Pat. No. 6,052,987, issued Apr. 25, 2000, to G. Dressler for "Non-Propellant Fluid Cooled Spacecraft Rocket Engine" discloses a coolant system for the combustor and nozzle of a rocket engine.

Various examples of rocket engines can be found in D. Huzel and D. Huang, "Modern Engineering for Design of Liquid-Propellant Rocket Engines," Volume 147 of AIAA Series "Progress in Astronautics and Aeronautics," pages 35–36, (1992).

DESCRIPTION OF THE INVENTION

Figure 1:
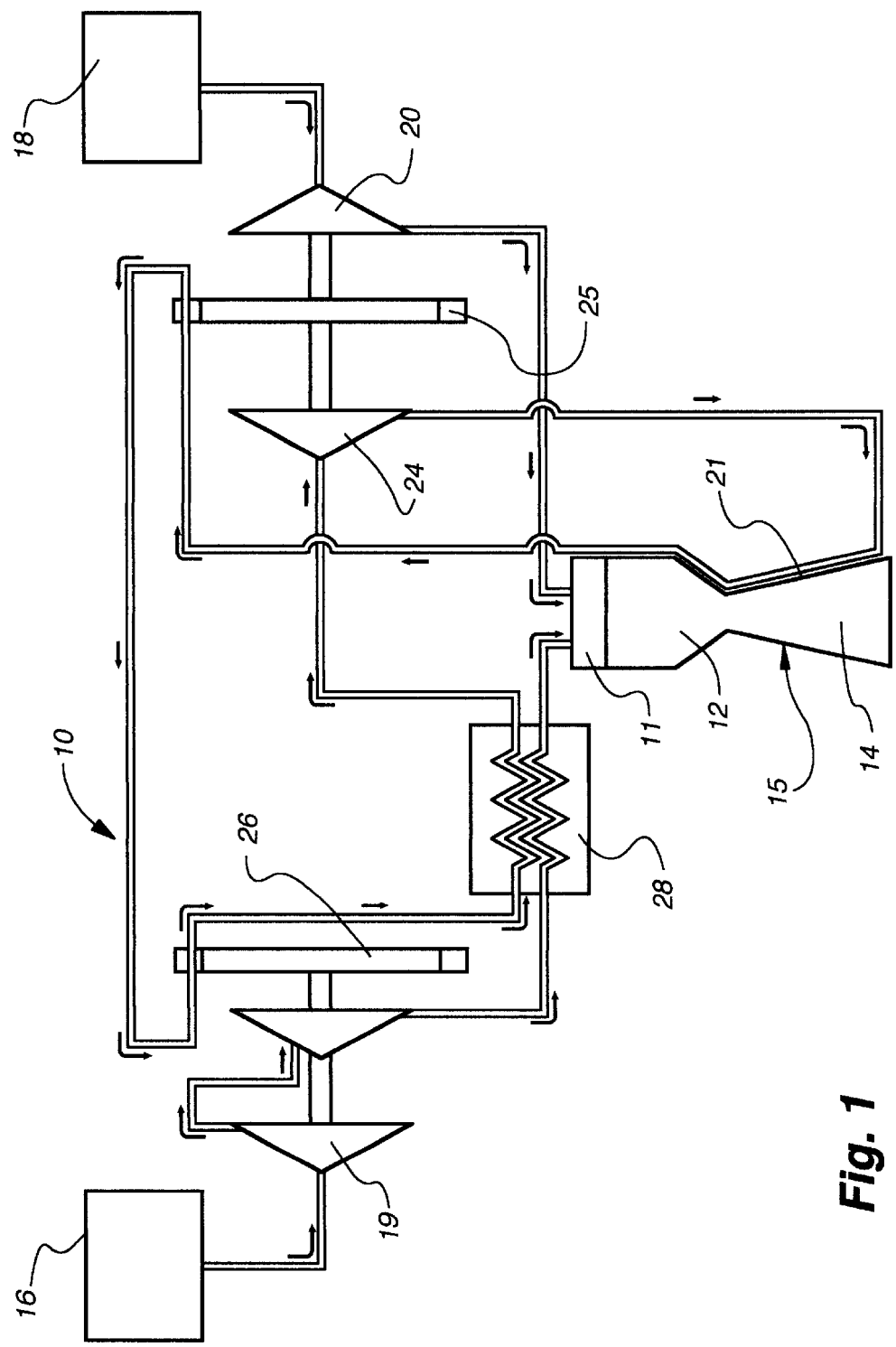
FIG. 1 is a diagrammatic representation of a rocket engine including a third fluid coolant system embodying the present invention.

A rocket engine 10 embodying the present invention, as shown in FIG. 1, includes a typical engine assembly constructed of an injector 11, combustor 12, and nozzle 14. The combustor 12 and nozzle 14 form a nozzle and combustor assembly 15. Fuel such as liquid hydrogen and an oxidizer such as liquid oxygen are fed from supply tanks thereof 16, 18 respectively to the injector 11. These fuel and oxidizer components, sometimes referred to as propellants, are mixed and fed to the combustor 12 wherein they are burned to produce propellant gases which are ejected from the nozzle 14 to propel the spacecraft. The fuel is fed to the injector 11 by a turbine driven fuel pump 19 while the oxidizer is fed to the injector 11 by a turbine driven oxidizer pump 20.

In accordance with the present invention the nozzle and combustor assembly 15 is cooled by a circulating coolant such as water, methanol, ethanol, or liquid having equivalent properties, and mixtures thereof. The coolant is circulated through a jacket 21 enclosing the nozzle and combustor assembly 15 by a turbine driven coolant pump 24. As the coolant circulates through the jacket 21, it is heated and vaporizes forming steam or like vapor or gaseous phase fluid. This vapor or gaseous phase fluid is fed to a first turbine 25 for driving the oxidizer pump 20 and coolant pump 24, and then to a second turbine 26 for driving the fuel pump 19.

The coolant vapor expands and is partially condensed in the turbines 25, 26 and the temperature thereof is reduced. The work of driving the turbines is produced by the expansion, temperature reduction, and partial condensation of the coolant vapors. The condensation process is completed in a heat exchanger 28 for exchanging heat between the coolant vapor and the incoming propellant, such as the liquid fuel or oxidizer or both. The coolant vapor condenses to heat the propellant thereby returning the heat removed by the coolant from the combustor to the propellant fed to the injector 11.

Figure 2:
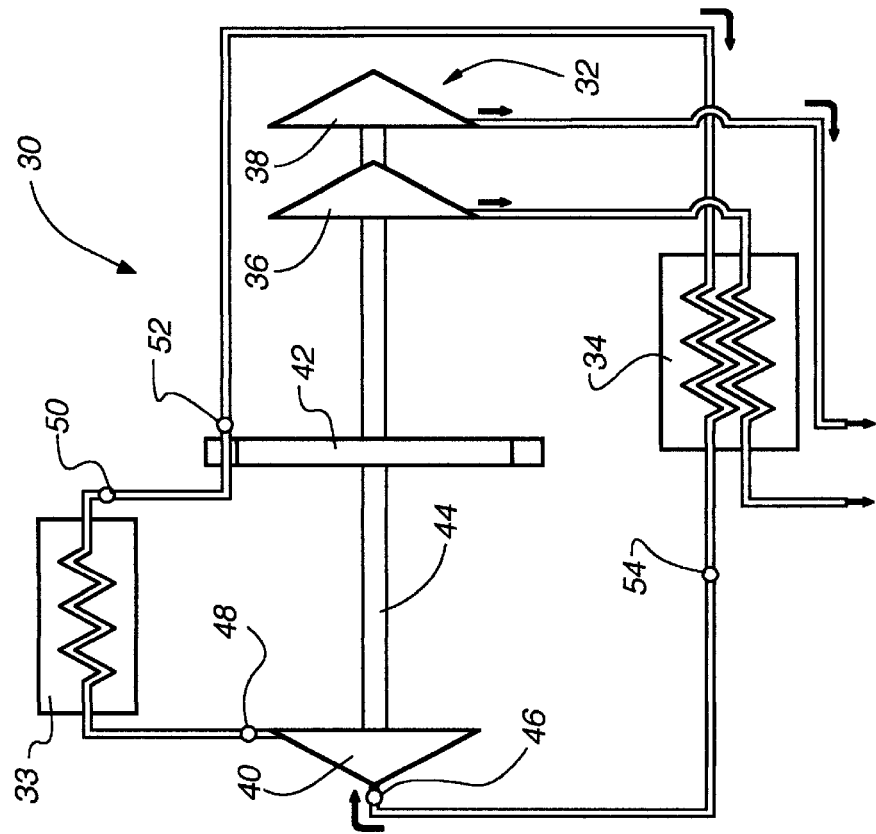
FIG. 2 is a diagrammatic representation of a third fluid coolant closed loop.

A third fluid closed loop 30 comprising turbomachinery 32, combustor jacket 33 (shown as a heat exchanger), and heat exchanger 34 is shown in FIG. 2. The fuel pump 36, oxidizer pump 38, water pump 40 and turbine 42 are mounted on one shaft 44.

Figure 3:
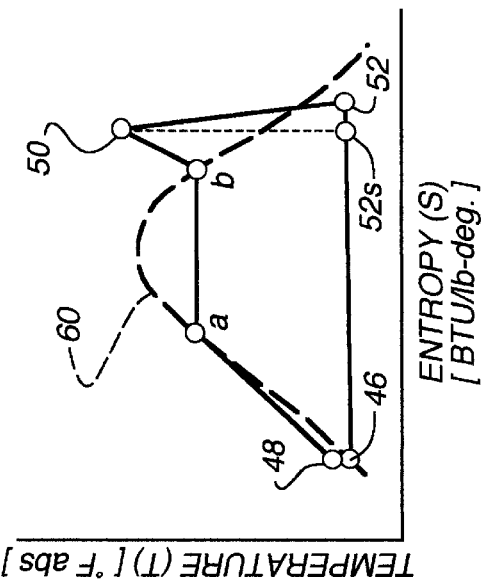
FIG. 3 is thermodynamic Temperature-Entropy (T-S) Rankine cycle diagram for the third fluid coolant employed in the present invention.

A known thermodynamic cycle, the Rankine cycle, for the flow of coolant such as water is shown in FIG. 3. The diagram shows the stations of the water flow path as shown in FIG. 2, namely water pump inlet 46, water pump exit 48, combustor jacket exit 50, turbine exit 52, heat exchanger exit 54 with the same parameters as in pump inlet 46. Line 60 defines the water saturation line. Points a and b correspond to intermediate stages of the water heating, point a corresponds to the beginning of the water evaporation in the combustor jacket, point b corresponds to the complete water evaporation in combustor jacket. Point 52s corresponds to the ideal process of the isotropic steam expansion (S=const) in the turbine. The solid lines in FIG. 3 correspond to the following stages in the process:

46–48—water pumping in pump 40;

48-a–b-50—water heating, evaporation, and steam heating in the combustor jacket 33;

50–52—steam expansion in the turbine (50–52s—ideal expansion);

52–46—steam condensation in the heat exchanger.

For purposes of comparing the present invention to the prior art, it is noted that in modern rocket engines (hereinafter LOX/LH engines are discussed for illustration purposes) hydrogen serves as combustor coolant and sole turbine driving fluid (in expander cycle) or part of turbine gas (in gas generator, tap-off, and staged combustion topping cycles) prior to entering combustor. To develop higher thrust in rocket engine, higher pressure in the combustor is required, since output thrust is directly related to combustor pressure and this, in turn, requires higher propellant flow rate.

In both coolant and turbine driver applications hydrogen flow losses significant amount of pressure generated by the pump. Table 1 shows pump/combustor pressure ratio for the hydrogen and characteristics of the pump complexity for the two different configuration and scale rocket engines, namely, Space Shuttle Main Engine (SSME) and RL10 engine used for the high altitude stages.

TABLE 1

Examples of the pump pressure

| Rocket Engine | SSME | RL10 |
| --- | --- | --- |
| Pump/Combustor Pressure Ratio | 2.14 | 2.34 |
| Pressure behind Hydrogen pump, bar | 433 | 96 |
| Number of hydrogen pump stages | 3 | 2 |

It is seen from Table 1 that hydrogen pressure behind the pump more than two-fold higher than pressure in the combustor. Meantime, hydrogen is the most difficult known liquid to pump due to very low density of approximately 70 kg/m³. This leads to lower than desired combustor pressure and explains complexity of the liquid hydrogen turbomachines, which particularly includes number of pump stages (see the Table1) and very high mechanical load on feeding system that reduces engines reliability and finally, prevent development of the truly reusable engines.

The expander rocket engine configuration described in U.S. Pat. No. 5,410,874 allows some combustor pressure increase compared to basic expander cycle. However, the combustor pressure still remains low compared to staged combustion cycle and maximum pump pressure/combustor pressure ratio shown in Table 1 basically remains preserved.

A non-propellant fluid cooled space craft rocket engine is known in prior art (U.S. Pat. No. 6,052,987). With that recirculating cooling system to maintain the rocket engine combustor at a lower temperature, spacecraft rocket engines may be constructed less expensively and can operate with greater safety by employing the more common metals in their construction. The cooling system also provides an easy means to warm and/or vaporize a propellant. However, in these pressure fed small engines, the coolant does not perform any useful work after it is heated in the combustor jacket. It means that heat absorbed by the coolant should be completely transferred to propellant, requiring a heavy heat exchanger since this heat transfer takes place at a lower temperature difference than in combustor jacket. Moreover, without creating useful work, coolant recirculation requires an external source of power such as an electrically operated coolant pump.

In order to reduce the size of the heat exchanger, in the present invention steam or vapor is partially condensed in the turbine. The more steam or vapor that is condensed in the turbine, the smaller the heat exchanger that is required. The prior art does not recommend moisture content in the turbine to be more than 12% since higher moisture causes turbine blades erosion. This recommendation is valid for power generation turbines with projected life time of tens of thousands of hours. The expected life time for even reusable rocket engines is not likely to exceed tens of hours; therefore, appropriate amount of moisture in the turbine exit can be expected to be noticeably higher than 12%.

A rocket engine embodying the present invention has the following advantages compared to the known staged combustion cycle of SSME type:

1) higher combustor pressure is attainable with the same level of turbopump technology (pressure behind the fuel pump can be the same or even lower compared to modern rocket engines);
2) same combustor pressure with significantly less pressure behind the pump, which allows to reduce turbomachinery (pumps, turbines, bearings, etc.) weight and size;
3) two preburners can be eliminated with corresponding weight savings. When developing a new engine of the same configuration, significant time and resources will be saved on preburners development;
4) lower turbomachinery loading allows to extend engine lifetime and introduce reusability.

Estimation shows that a third fluid cooled expander rocket engine embodying the present invention with the same combustor pressure as SSME (approximately 200 bar), and the same fuel and oxidizer flow rates (same flow rates and combustor pressure mean the same thrust) provides some 50% increase in the engine thrust-to-weight ratio due to weight savings. This is possible because two gas generating preburners have been eliminated and the fuel turbopump size has been reduced. Instead of the pump/combustor pressure ratio 2.14 for SSME as indicated in Table 1, this ratio for the new cycle can be as low as 1.2. Table 2 gives an illustrative comparison of the mass breakdown estimation completed for Block II SSME type engine, and a third fluid cooled expander rocket engine. Major weight savers are: turbopumps, hot gas manifold, preburners. The combustor and heat exchanger for steam condensation represent major weight gainers.

TABLE 2

Weight Comparison

| | Block II SSME type engine components weight, lb | Rocket engine in accordance with present invention. Components weight, lb | Weight change, lb |
| --- | --- | --- | --- |
| Combustor/nozzle assembly (combustor, injector head, nozzle, gimbal) | 1786 | 1897 | +111 |
| Turbopumps group (low speed turbopumps, high speed turbopumps) | 2500 | 961 | −1539 |
| System (ducting, pressurization, etc.) | 1219 | 454 | −765 |
| Miscellaneous (preburners, manifolds, valves, controls) | 2269 | 997 | −1272 |
| Steam/hydrogen heat exchanger | | 835 | +835 |
| Total Weight, lb | 7774 | 5143 | −34% |

If liquid hydrogen is a fuel then according to FIGS. 2 and 3 in the steam/hydrogen heat exchanger steam meets liquid hydrogen from behind the pump, rather low wall temperature from the water side can be expected. If this temperature is below the water freezing point, it may lead to ice formation from the water flow path and eventually blockage of the water flow path. This problem can be resolved through heat transfer leading to unreasonable heat exchanger weight. Another approach is to increase coolant freezing temperature through the use of a mixture of water and an alcohol.

What is claimed is:

1. A rocket engine comprising:

an injector;

a propellant fuel supply;

a propelant oxidizer supply;

a pump for feeding fuel from said fuel supply to said injector;

a pump for feeding oxidizer from said oxidizer supply to said injector;

a combustor;

a nozzle;

said combustor and nozzle forming a combustor and nozzle assembly;

a cooling jacket surrounding said combustor and nozzle assembly;

a coolant fluid;

a coolant pump for circulating said coolant fluid through said jacket to vaporize said coolant fluid and cool said combustor and nozzle assembly;

a turbine operatively connected to said coolant pump and driven by vaporized coolant from said jacket;

and a heat exchanger for transferring heat from said vaporized fluid to a propellant prior to the feeding of said propellant into said injector, said vaporized coolant fluid being condensed in said turbine and heat exchanger for recirculation to said combustor and nozzle assembly jacket.

2. A rocket engine as defined in claim 1 wherein said coolant fluid is water.

3. A rocket engine as defined in claim 1 wherein said coolant fluid is a water and alcohol mixture.

4. A rocket engine as defined in claim 1 wherein said turbine is further operatively connected to said oxidizer pump and said fuel pump for driving the same.

5. A rocket engine comprising:
   an injector;
   a propellant fuel supply;
   a propellant oxidizer supply;
   a pump for feeding fuel from said fuel supply to said injector;
   a pump for feeding oxidizer from said oxidizer supply to said injector;
   a combustor;
   a nozzle;
   said combustor and nozzle forming a combustor and nozzle assembly;
   a cooling jacket surrounding said combustor and nozzle assembly;
   a coolant fluid;
   a coolant pump for circulating said coolant fluid through said jacket to vaporize said coolant fluid and cool said combustor and nozzle assembly;
   a first turbine operatively connected to said coolant pump and said oxidizer pump and driven by vaporized coolant from said jacket;
   a second turbine operatively connected to said fuel pump and driven by vaporized coolant from said jacket;
   and a heat exchanger for transferring heat from said vaporized fluid to propellant prior to the feeding of said propellant into said injector, said vaporized coolant fluid being condensed in said turbines and heat exchanger for recirculation to said combustor and nozzle assembly jacket.

6. A coolant system for a rocket engine comprising an injector, a propellant fuel supply, a propellant oxidizer supply, a pump for feeding fuel from said fuel supply to said injector, a pump for feeding oxidizer from said oxidizer supply to said injector, a combustor, and a nozzle, said combustor and nozzle forming a combustor and nozzle assembly;
   said coolant system comprising:
   a cooling jacket surrounding said combustor and nozzle assembly;
   a coolant fluid;
   a coolant pump for circulating said coolant fluid through said jacket to vaporize said coolant fluid and cool said combustor and nozzle assembly;
   a turbine operatively connected to said coolant pump and driven by vaporized coolant from said jacket;
   and a heat exchanger for transferring heat from said vaporized fluid to propellant prior to the feeding of said propellant into said injector, said vaporized coolant fluid being condensed in said turbine and heat exchanger for recirculation to said combustor and nozzle assembly jacket.

7. A coolant system for a rocket engine as defined in claim 6 wherein said coolant fluid is selected from the group consisting of water, methanol, ethanol and mixtures thereof.

8. A coolant system as defined in claim 6 wherein said turbine is further operatively connected to said oxidizer pump and said fuel pump for driving the same.

9. A coolant system for a rocket engine comprising an injector, a fuel supply, an oxidizer supply, a pump for feeding propellant fuel from said fuel supply to said injector, a pump for feeding propellant oxidizer from said oxidizer supply to said injector, a combustor, and a nozzle, said combustor and nozzle forming a combustor and nozzle assembly; said coolant system comprising:
   a cooling jacket surrounding said combustor and nozzle assembly;
   a coolant fluid;
   a coolant pump for circulating said coolant fluid through said jacket to vaporize said coolant fluid and cool said combustor and nozzle assembly;
   a first turbine operatively connected to said coolant pump and said oxidizer pump and driven by vaporized coolant from said jacket;
   a second turbine operatively connected to said fuel pump and driven by vaporized coolant from said first turbine;
   and a heat exchanger for transferring heat from said vaporized fluid to propellant prior to the feeding of said propellant into said injector, said vaporized coolant fluid being condensed in said turbines and heat exchanger for recirculation to said combustor and nozzle assembly jacket.

10. A coolant system for a rocket engine as defined in claim 9 wherein said coolant fluid is selected from the group consisting of water, methanol, ethanol and mixtures thereof.

11. A method of cooling a rocket engine comprising an injector, a propellant fuel supply, a propellant oxidizer supply, a pump for feeding fuel from said fuel supply to said injector, a pump for feeding oxidizer from said oxidizer supply to said injector, a combustor, a nozzle, said combustor and nozzle forming a combustor and nozzle assembly, a cooling jacket surrounding said combustor and nozzle assembly, a coolant fluid, a coolant pump for circulating said coolant fluid through said jacket, a turbine operatively connected to said coolant pump, a heat exchanger operatively connected to said propellant supply and said turbine, said method comprising the steps of:
   vaporizing said coolant fluid in said combustor and nozzle assembly to cool the same;
   driving said turbine with said vaporized coolant from said jacket;
   transferring heat from said vaporized fluid to propellant in said heat exchanger prior to the feeding of said propellant into said injector; and
   condensing said vaporized coolant fluid in said turbine and heat exchanger and recirculating said condensed fluid to said combustor and nozzle assembly jacket.

12. A method of cooling a rocket engine as defined in claim 11 wherein said turbine is further operatively connected to said fuel pump and said oxidizer pump.

13. A method of cooling a rocket engine comprising an injector, a propellant fuel supply, a propellant oxidizer supply, a pump for feeding fuel from said fuel supply to said injector, a pump for feeding oxidizer from said oxidizer supply to said injector, a combustor, a nozzle, said combustor and nozzle forming a combustor and nozzle assembly, a cooling jacket surrounding said combustor and nozzle assembly, a coolant fluid, a coolant pump for circulating said coolant fluid through said jacket, a first turbine operatively connected to said coolant pump and said oxidizer pump, a second turbine operatively connected to said fuel pump, a heat exchanger operatively connected to said propellant supply, said method comprising the steps of:

vaporizing said coolant fluid in said combustor and nozzle assembly to cool the same;

driving said turbines with said vaporized coolant from said jacket;

transferring heat from said vaporized fluid to propellant in said heat exchanger prior to the feeding of said propellant into said injector; and condensing said vaporized coolant fluid in said turbines and heat exchanger and recirculating said condensed fluid to said combustor and nozzle assembly jacket.

14. A method of cooling a rocket engine as defined in claim 11 wherein said coolant fluid is selected from the group consisting of water, methanol, ethanol and mixtures thereof.

15. A method of cooling a rocket engine as defined in claim 13 wherein said coolant fluid is selected from the group consisting of water, methanol, ethanol and mixtures thereof.

16. A method for cooling the combustor jacket of a rocket engine with a vaporizable liquid coolant, said engine having at least one turbine driving a fuel pump, an oxidizer pump, and a coolant pump, and a heat exchanger for transferring heat from said coolant to fuel for said engine, comprising the steps of:

cooling said engine combustor jacket with said liquid coolant by vaporizing said coolant to form a heated vapor;

expanding said heated vapor in said at least one turbine to drive said turbine and thereby said pumps;

condensing said vapor to a liquid in said heat exchanger; and pumping said coolant liquid with said coolant pump to said engine combustor jacket.

* * * * *